United States Patent
Wang et al.

(10) Patent No.: US 12,057,067 B2
(45) Date of Patent: Aug. 6, 2024

(54) SELF-COMPENSATION OF DRIVING TRANSISTOR THRESHOLD VOLTAGE USING BODY EFFECT

(71) Applicant: META PLATFORMS TECHNOLOGIES, LLC, Menlo Park, CA (US)

(72) Inventors: Qianqian Wang, Santa Clara, CA (US); Min Hyuk Choi, San Jose, CA (US); Gang Chen, San Jose, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/709,989

(22) Filed: Mar. 31, 2022

(65) Prior Publication Data

US 2023/0317012 A1  Oct. 5, 2023

(51) Int. Cl.
*G09G 3/3233* (2016.01)
*G02B 27/01* (2006.01)
*G09G 3/3258* (2016.01)
*G09G 3/3291* (2016.01)

(52) U.S. Cl.
CPC ....... *G09G 3/3233* (2013.01); *G02B 27/0172* (2013.01); *G09G 3/3258* (2013.01); *G09G 3/3291* (2013.01); *G02B 2027/0178* (2013.01); *G09G 2300/0876* (2013.01); *G09G 2310/0297* (2013.01)

(58) Field of Classification Search
CPC ............... G09G 3/3258; G09G 3/3291; G09G 2300/0876; G09G 2310/0297; G09G 3/32; G09G 3/3233; G02B 27/0172; G02B 2027/0178

USPC ....................................................... 345/55, 76
See application file for complete search history.

(56) References Cited

U.S. PATENT DOCUMENTS

| | | | |
|---|---|---|---|
| 5,317,236 A * | 5/1994 | Zavracky | H05B 33/12 257/E29.295 |
| 8,232,933 B2 * | 7/2012 | Kim | G09G 3/3233 345/76 |
| 9,478,169 B2 * | 10/2016 | Lim | H10K 59/131 |
| 10,783,830 B1 * | 9/2020 | Lu | G09G 3/3258 |
| 11,430,389 B2 * | 8/2022 | Fujii | H01L 27/124 |

(Continued)

FOREIGN PATENT DOCUMENTS

JP    2021089398 A    6/2021

OTHER PUBLICATIONS

International Search Report and Written Opinion for International Application No. PCT/US2023/016681, mailed Jun. 27, 2023, 13 pages.

*Primary Examiner* — Jason M Mandeville
(74) *Attorney, Agent, or Firm* — Weaver Austin Villeneuve & Sampson LLP (57) ABSTRACT

Embodiments relate to a display device including pixels that compensate a threshold voltage of a driving transistor using the body effect. Pixel data for the driving transistor increases the source-bulk voltage of the driving transistor during a compensation period as a result of the body effect. A separate reference voltage is not received at the pixel for the purpose of compensating the threshold voltage of the driving transistor. The increased source-bulk voltage is then used in an emission period of the pixel to compensate for the threshold voltage of the driving transistor.

20 Claims, 10 Drawing Sheets

(56) References Cited

U.S. PATENT DOCUMENTS

| | | | | |
|---|---|---|---|---|
| 11,749,202 B2* | 9/2023 | Yang | ...................... | G11C 19/28 |
| | | | | 345/204 |
| 2011/0001740 A1* | 1/2011 | Jo | ........................ | G09G 3/3233 |
| | | | | 345/76 |
| 2013/0043802 A1* | 2/2013 | Han | ..................... | G09G 3/3233 |
| | | | | 315/240 |
| 2015/0145849 A1 | 5/2015 | Choi et al. | | |
| 2016/0062522 A1* | 3/2016 | Yang | ...................... | G06F 3/042 |
| | | | | 345/174 |
| 2016/0104424 A1* | 4/2016 | Lim | ..................... | G09G 3/3233 |
| | | | | 345/76 |
| 2017/0124941 A1* | 5/2017 | Na | ........................ | G09G 3/2092 |
| 2017/0200414 A1* | 7/2017 | Li | ........................ | G09G 3/3291 |
| 2018/0301092 A1* | 10/2018 | Ma | ....................... | G09G 3/3258 |
| 2019/0005889 A1* | 1/2019 | Kwon | ....................... | G09G 3/30 |
| 2019/0019458 A1* | 1/2019 | Teraguchi | ............ | H10K 59/123 |
| 2020/0184893 A1* | 6/2020 | Dong | ...................... | G09G 3/3233 |
| 2023/0005421 A1 | 1/2023 | Sakaguchi et al. | | |
| 2023/0368731 A1* | 11/2023 | Toyoda | ................ | G09G 3/3233 |

* cited by examiner

SELF-COMPENSATION OF DRIVING TRANSISTOR THRESHOLD VOLTAGE USING BODY EFFECT

BACKGROUND

This disclosure relates to a display device, and specifically to compensation of the threshold voltage of a driving transistor in a pixel.

A display device is often used in a virtual reality (VR) or augmented-reality (AR) system as a head-mounted display (HMD) or a near-eye display (NED). To display high resolution images, it is beneficial to increase the number of pixels in the display device and operate the display device with a higher frame rate. However, when there is an increased number of pixels in a display device being operated at a higher frame rate, time allocated for preparing and writing of data to pixels are reduced. Especially, when organic light emitting diode (OLED) display devices are used, operations associated with compensating the threshold voltage of driving transistors by using a reference voltage tend to take up an extended amount of time. Such prolonged time associated with the compensation of the threshold voltage restricts a number of pixels that may be multiplexed to receive pixel data over a data line.

SUMMARY

Embodiments relate to a display device having a pixel that self-compensates a threshold voltage of a driving transistor in the pixel by using the body-effect of the driving transistor. The display device includes a data line, a gate line that intersects with the data line and the pixel. The pixel includes an organic light emitting diode, a first switch, a second switch and the driving transistor. The organic light emitting diode (OLED) is coupled between a low voltage source and the driving transistor. The first switch selectively passes through a pixel data from the data line after receiving a gate signal from the gate line. The first switch turned on in a data writing period and in a compensation period subsequent to the data writing period. The second switch is coupled between to a high voltage source and the driving transistor. The second switch is turned on in the data writing period but is turned off in the compensation period. The driving transistor has a drain coupled to the OLED, a gate coupled to the first switch to receive the pixel data in the data writing period and in the compensation period, and a source coupled to the second switch. The source-bulk voltage of the driving transistor is set as a function of the pixel data in the compensation period. The current from the drain of the driving transistor to the OLED in an emission period is adjusted by the source-bulk voltage as set in the compensation period to compensate for the threshold voltage of the driving transistor.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1A:
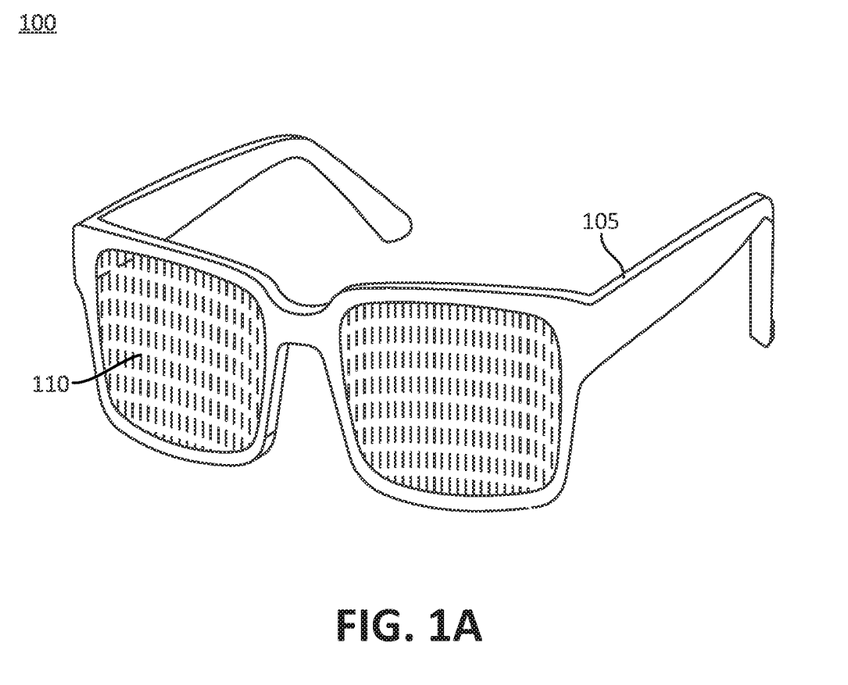
FIGS. 1A and 1B are diagrams of head-mounted displays (HMDs) that include near-eye displays (NED), according to some embodiments.
Figure 1B:
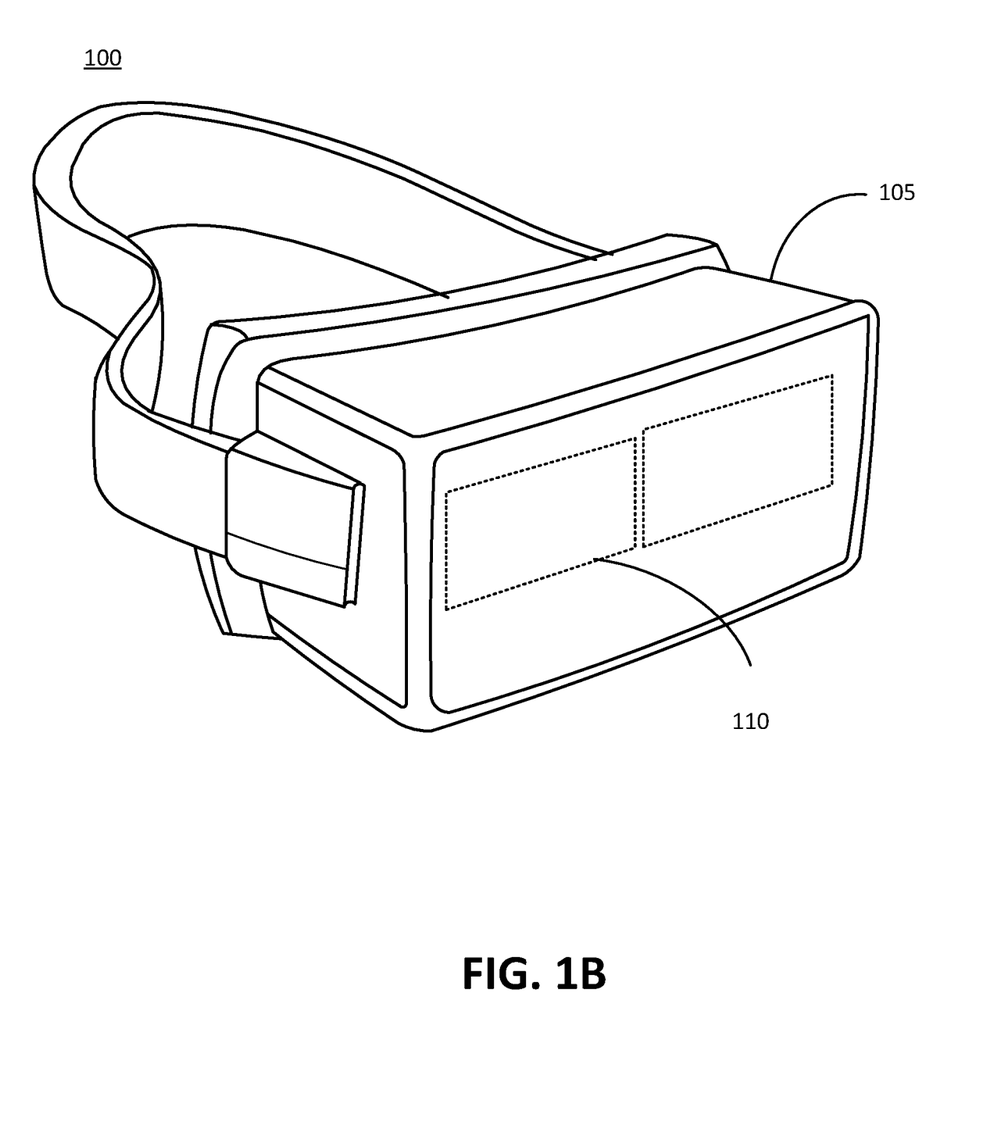

FIGS. 1A and 1B are diagrams of head-mounted displays (HMDs) 100 that include near-eye displays (NED) 110, according to some embodiments. The 110 may present media to a user. Examples of media that may be presented by the NED 110 include one or more images, video, audio, or some combination thereof. In some embodiments, audio may be presented via an external device (e.g., speakers and/or headphones) that receives audio information from the HMD 100, a console (not shown), or both, and presents audio data to the user based on the audio information. The HMD 100 is generally configured to operate as a virtual reality (VR) HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., still images, video, sound, etc.).

The HMD 100 shown in FIG. 1A or 1B may include a frame 105 and a display 110. The frame 105 may include one or more optical elements that together display media to a user. That is, the display 110 may be configured for a user to view the content presented by HMD 100. As discussed below in conjunction with FIG. 2, the display 110 may include at least one source assembly to generate image light to present optical media to an eye of the user. The source assembly may include, e.g., a source, an optics system, or some combination thereof.

FIGS. 1A and 1B are merely examples of a virtual reality system, and the display systems described herein may be incorporated into further such systems.

Figure 2:
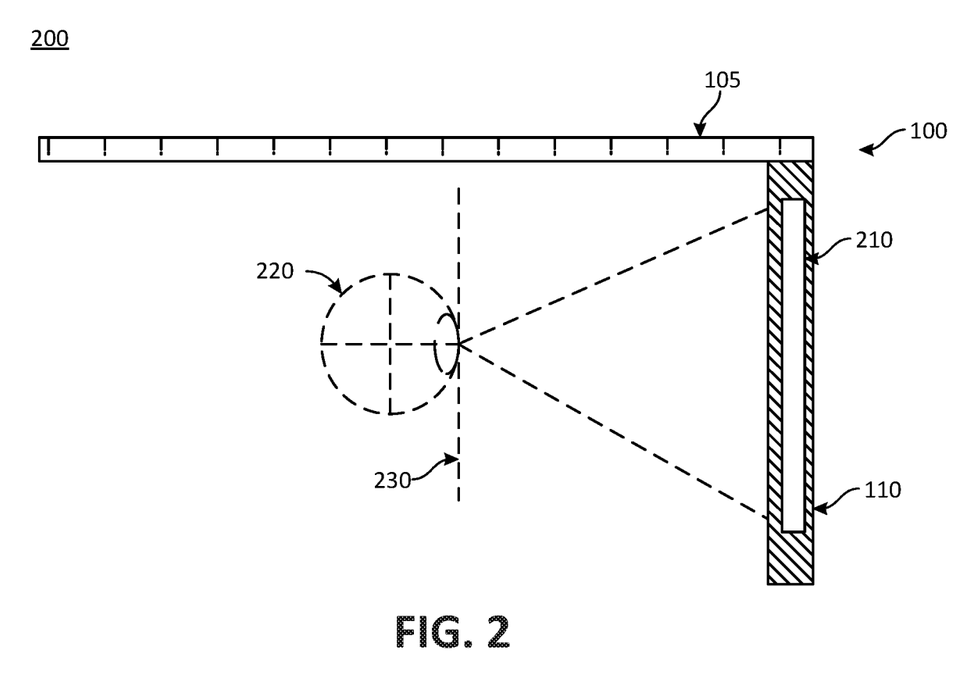
FIG. 2 is a cross-sectional view of the HMD illustrated in FIG. 1A or 1B, according to some embodiments.

FIG. 2 is a cross section 200 of the HMD 100 illustrated in FIG. 1A or 1B, in accordance with some embodiments of the present disclosure. The cross section 200 may include at least one display assembly 210, and an exit pupil 230. The exit pupil 230 is a location where the eye 220 may be positioned when the user wears the HMD 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly that is separate from or integrated with the display assembly 210 shown in FIG. 2, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the HMD 100.

In alternate configurations, the HMD 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as an organic light-emitting diode (OLED).

Figure 3:
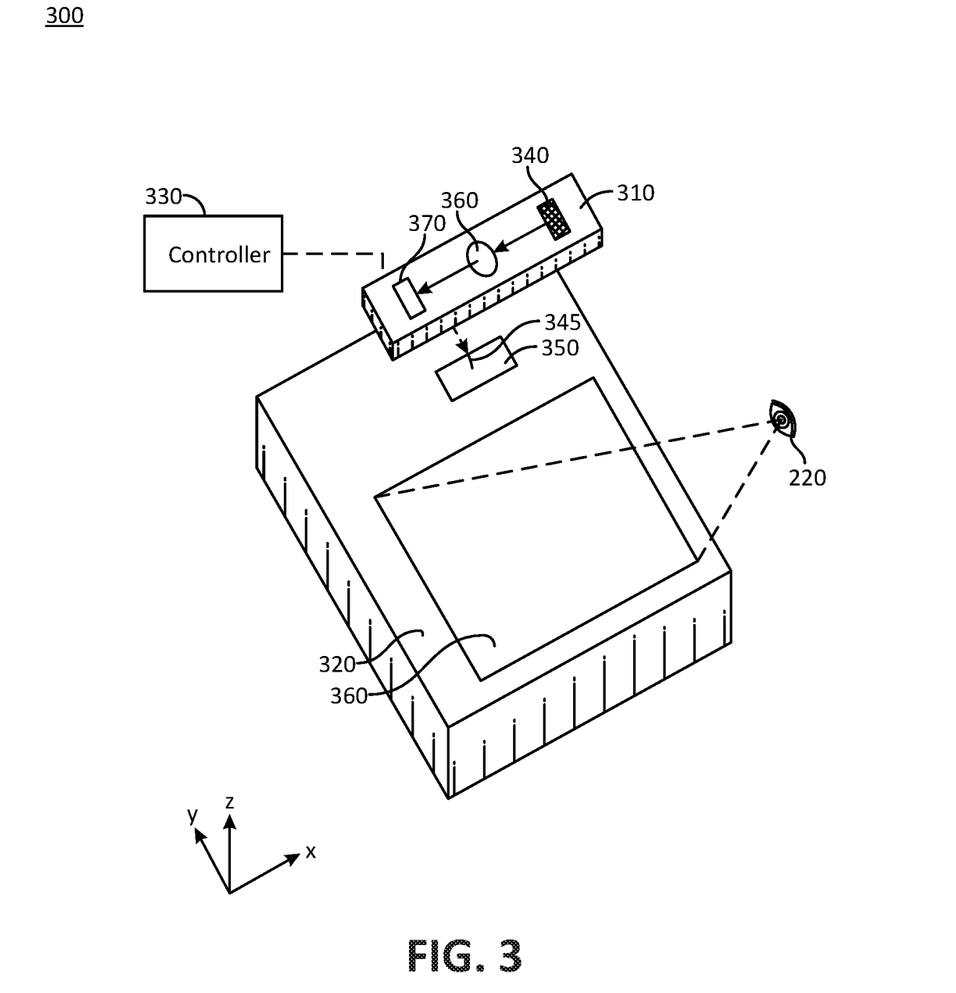
FIG. 3 illustrates a perspective view of a waveguide display, according to some embodiments.

FIG. 3 illustrates a perspective view of a waveguide display 300 in accordance with some embodiments. The waveguide display 300 may be a component (e.g., display assembly 210) of HMD 100. In alternate embodiments, the waveguide display 300 may constitute a part of some other HMD, or other system that directs display image light to a particular location.

The waveguide display 300 may include, among other components, a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, for instance, one or more components may be shared between waveguide displays for each eye.

The source assembly 310 generates image light. The source assembly 310 may include a source 340, a light conditioning assembly 360, and a scanning mirror assembly 370. The source assembly 310 may generate and output image light 345 to a coupling element 350 of the output waveguide 320.

The source 340 may include a source of light that generates at least a coherent or partially coherent image light 345. The source 340 may emit light in accordance with one or more illumination parameters received from the controller 330. The source 340 may include one or more source elements, including, but not restricted to light emitting diodes, such as micro-OLEDs, as described in detail below with reference to FIGS. 4-10.

The output waveguide 320 may be configured as an optical waveguide that outputs image light to an eye 220 of a user. The output waveguide 320 receives the image light 345 through one or more coupling elements 350 and guides the received input image light 345 to one or more decoupling elements 360. In some embodiments, the coupling element 350 couples the image light 345 from the source assembly 310 into the output waveguide 320. The coupling element 350 may be or include a diffraction grating, a holographic grating, some other element that couples the image light 345 into the output waveguide 320, or some combination thereof. For example, in embodiments where the coupling element 350 is a diffraction grating, the pitch of the diffraction grating may be chosen such that total internal reflection occurs, and the image light 345 propagates internally toward the decoupling element 360. For example, the pitch of the diffraction grating may be in the range of approximately 300 nm to approximately 600 nm.

The decoupling element 360 decouples the total internally reflected image light from the output waveguide 320. The decoupling element 360 may be or include a diffraction grating, a holographic grating, some other element that decouples image light out of the output waveguide 320, or some combination thereof. For example, in embodiments where the decoupling element 360 is a diffraction grating, the pitch of the diffraction grating may be chosen to cause incident image light to exit the output waveguide 320. An orientation and position of the image light exiting from the output waveguide 320 may be controlled by changing an orientation and position of the image light 345 entering the coupling element 350.

The output waveguide 320 may be composed of one or more materials that facilitate total internal reflection of the image light 345. The output waveguide 320 may be composed of, for example, silicon, glass, or a polymer, or some combination thereof. The output waveguide 320 may have a relatively small form factor such as for use in a head-mounted display. For example, the output waveguide 320 may be approximately 30 mm wide along an x-dimension, 50 mm long along a y-dimension, and 0.5-1 mm thick along a z-dimension. In some embodiments, the output waveguide 320 may be a planar (2D) optical waveguide.

The controller 330 may be used to control the scanning operations of the source assembly 310. In certain embodiments, the controller 330 may determine scanning instructions for the source assembly 310 based at least on one or more display instructions. Display instructions may include instructions to render one or more images. In some embodiments, display instructions may include an image file (e.g., bitmap). The display instructions may be received from, e.g., a console of a virtual reality system (not shown). Scanning instructions may include instructions used by the source assembly 310 to generate image light 345. The scanning instructions may include, e.g., a type of a source of image light (e.g. monochromatic, polychromatic), a scanning rate, an orientation of scanning mirror assembly 370, and/or one or more illumination parameters, etc. The controller 330 may include a combination of hardware, software, and/or firmware not shown here so as not to obscure other aspects of the disclosure.

According to some embodiments, source 340 may include a light emitting diode (LED), such as an organic light emitting diode (OLED). An organic light-emitting diode (OLED) is a light-emitting diode (LED) having an emissive electroluminescent layer that may include a thin film of an organic compound that emits light in response to an electric current. The organic layer is typically situated between a pair of conductive electrodes. One or both of the electrodes may be transparent.

As will be appreciated, an OLED display can be driven with a passive-matrix (PMOLED) or active-matrix (AMOLED) control scheme. In a PMOLED scheme, each row (and line) in the display may be controlled sequentially, whereas AMOLED control typically uses a thin-film transistor backplane to directly access and switch each individual pixel on or off, which allows for higher resolution and larger display areas.

In other embodiments, the OLED display is embodied as part of a display panel that does not include any waveguide. The OLED display may be a screen that is viewable directly by to the user's eye instead of passing light through a waveguide.

Figure 4:
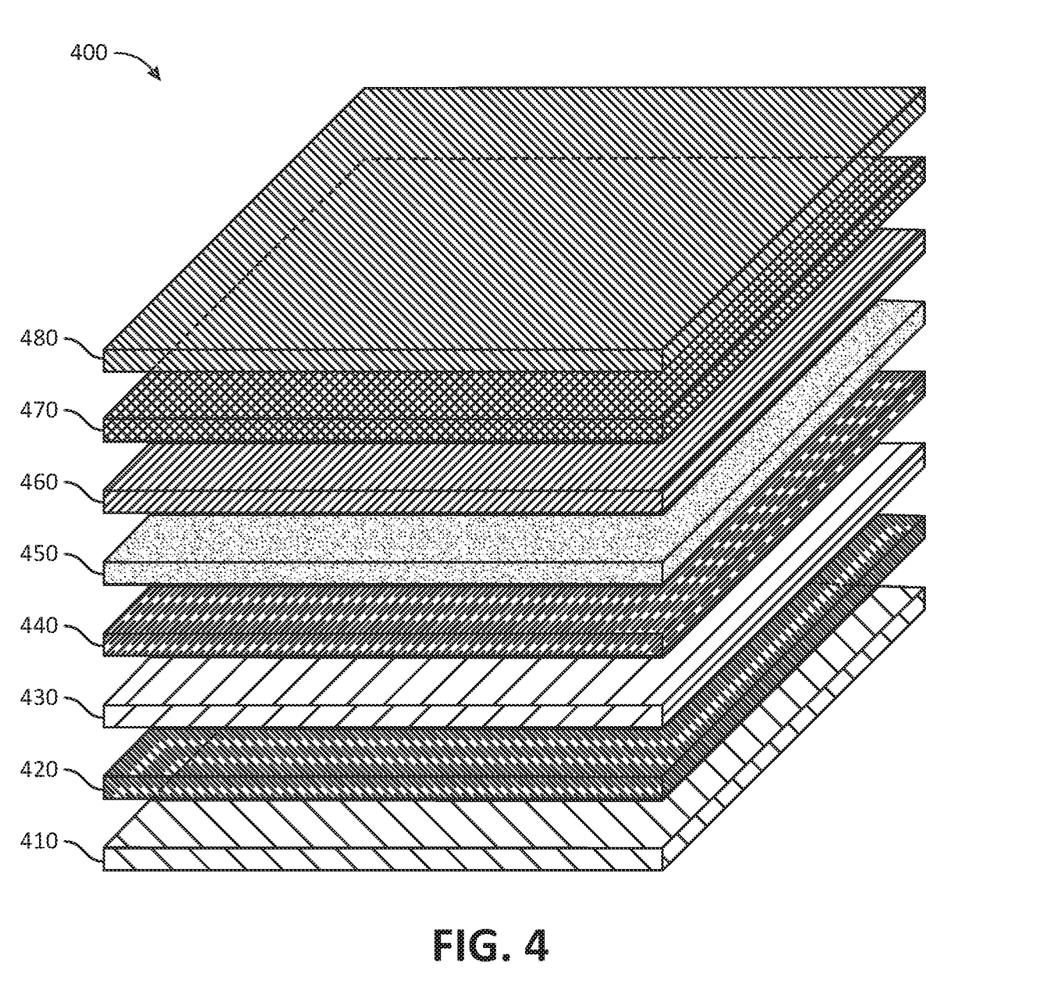
FIG. 4 depicts a simplified organic light emitting diode (OLED) structure, according to some embodiments.

FIG. 4 depicts a simplified OLED structure according to some embodiments. As shown in an exploded view, OLED 400 may include, from bottom to top, a substrate 410, anode 420, hole injection layer 430, hole transport layer 440, emissive layer 450, blocking layer 460, electron transport layer 470, and cathode 480. In some embodiments, substrate (or backplane) 410 may include single crystal or polycrystalline silicon or other suitable semiconductor (e.g., germanium).

Anode 420 and cathode 480 may include any suitable conductive material(s), such as transparent conductive oxides (TCOs, e.g., indium tin oxide (ITO), zinc oxide (ZnO), and the like). The anode 420 and cathode 480 are configured to inject holes and electrons, respectively, into one or more organic layer(s) within emissive layer 450 during operation of the device.

The hole injection layer 430, which is disposed over the anode 420, receives holes from the anode 420 and is configured to inject the holes deeper into the device, while the adjacent hole transport layer 440 may support the transport of holes to the emissive layer 450. The emissive layer 450 converts electrical energy to light. Emissive layer 450 may include one or more organic molecules, or light-emitting fluorescent dyes or dopants, which may be dispersed in a suitable matrix as known to those skilled in the art.

Blocking layer 460 may improve device function by confining electrons (charge carriers) to the emissive layer 450. Electron transport layer 470 may support the transport of electrons from the cathode 480 to the emissive layer 450.

In some embodiments, the generation of red, green, and blue light (to render full-color images) may include the formation of red, green, and blue OLED sub-pixels in each pixel of the display. Alternatively, the OLED 400 may be adapted to produce white light in each pixel. The white light may be passed through a color filter to produce red, green, and blue sub-pixels.

Any suitable deposition process(es) may be used to form OLED 400. For example, one or more of the layers constituting the OLED may be fabricated using physical vapor deposition (PVD), chemical vapor deposition (CVD), evaporation, spray-coating, spin-coating, atomic layer deposition (ALD), and the like. In further aspects, OLED 400 may be manufactured using a thermal evaporator, a sputtering system, printing, stamping, etc.

According to some embodiments, OLED 400 may be a micro-OLED. A "micro-OLED," in accordance with various examples, may refer to a particular type of OLED having a small active light emitting area (e.g., less than 2,000 $\mu m^2$ in some embodiments, less than 20 $\mu m^2$ or less than 10 $\mu m^2$ in other embodiments). In some embodiments, the emissive surface of the micro-OLED may have a diameter of less than approximately 2 $\mu m$. Such a micro-OLED may also have collimated light output, which may increase the brightness level of light emitted from the small active light emitting area.

Figure 5:
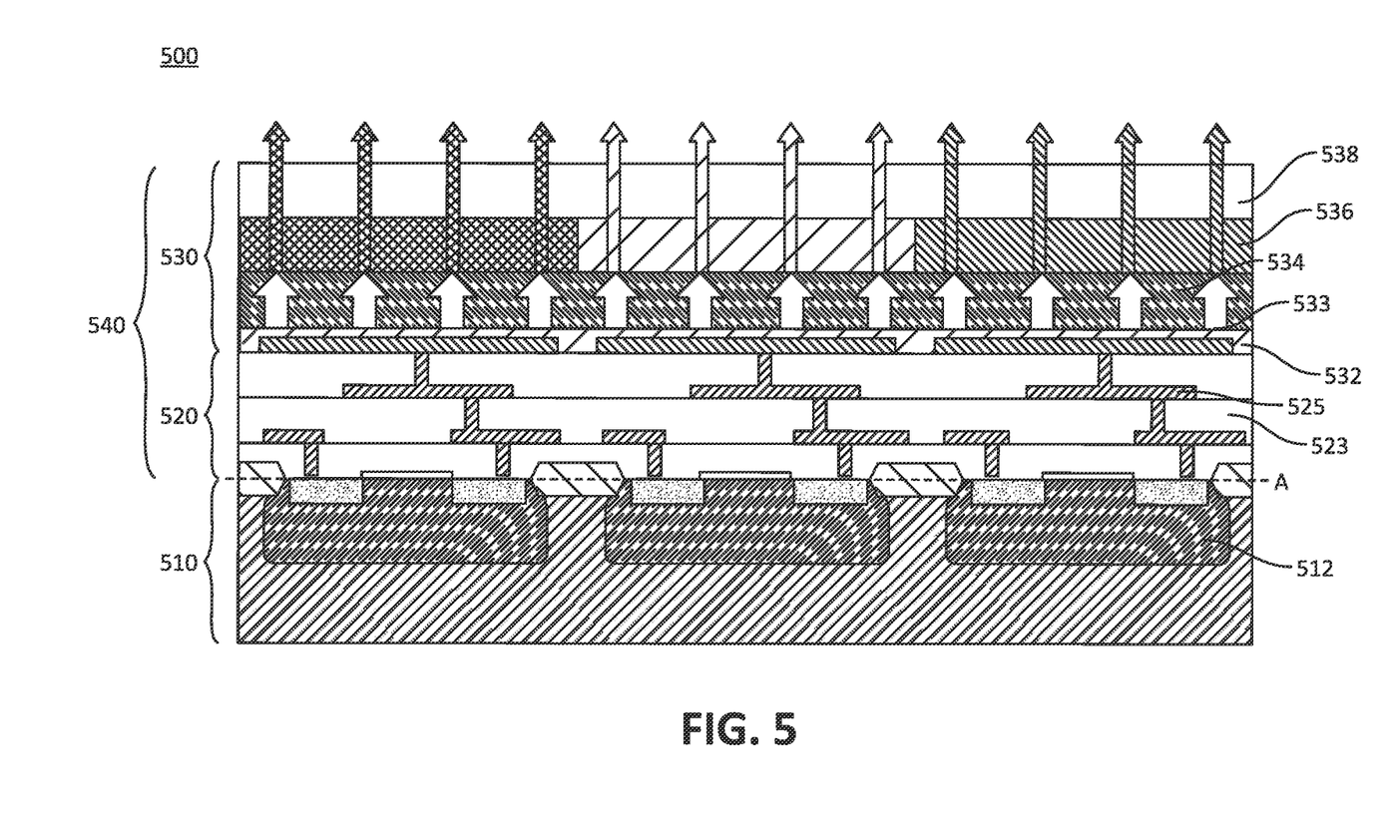
FIG. 5 is a schematic view of an OLED display device architecture including a display driver integrated circuit (DDIC), according to some embodiments.

FIG. 5 is a schematic view of an OLED display device architecture including a display driver integrated circuit (DDIC) 510 according to some embodiments. According to some embodiments, OLED display device 500 (e.g., micro-OLED chip) may include an active display area 530 having an active matrix 532 (such as OLED 400) disposed over a single crystal (e.g., silicon) backplane 520. The combined display/backplane architecture, i.e., display element 540 may be bonded (e.g., at or about interface A) directly or indirectly to the DDIC 510. As illustrated in FIG. 5, DDIC 510 may include an array of driving transistors 512, which may be formed using conventional CMOS processing. One or more display driver integrated circuits may be formed over a single crystal (e.g., silicon) substrate.

In some embodiments, the active display area 530 may have at least one areal dimension (i.e., length or width) greater than approximately 1.3 inches, e.g., approximately 1.4, 1.5, 1.6, 1.7, 1.8, 1.9, 2.0, 2.25, 2.5, 2.75, or 3 inches, including ranges between any of the foregoing values, although larger area displays are contemplated.

Backplane 520 may include a single crystal or polycrystalline silicon layer 523 having a through silicon via 525 for electrically connecting the DDIC 510 with the active display area 530. In some embodiments, active display area 530 may further include a transparent encapsulation layer 534 disposed over an upper emissive surface 533 of active matrix 532, a color filter 536, and cover glass 538.

According to various embodiments, the active display area 530 and underlying backplane 520 may be manufactured separately from, and then later bonded to, DDIC 510, which may simplify formation of the OLED active area, including formation of the active matrix 532, color filter 536, etc.

The DDIC 510 may be directly bonded to a back face of the backplane opposite to active matrix 532. In further embodiments, a chip-on-flex (COF) packaging technology may be used to integrate display element 540 with DDIC 510, optionally via a data selector (i.e., multiplexer) array (not shown) to form OLED display device 500. As used herein, the terms "multiplexer" or "data selector" may, in some examples, refer to a device adapted to combine or select from among plural analog or digital input signals, which are transmitted to a single output. Multiplexers may be used to increase the amount of data that can be communicated within a certain amount of space, time, and bandwidth.

As used herein, "chip-on-flex" (COF) may, in some examples, refer to an assembly technology where a microchip or die, such as an OLED chip, is directly mounted on and electrically connected to a flexible circuit, such as a direct driver circuit. In a COF assembly, the microchip may avoid some of the traditional assembly steps used for individual IC packaging. This may simplify the overall processes of design and manufacture while improving performance and yield.

In accordance with certain embodiments, assembly of the COF may include attaching a die to a flexible substrate, electrically connecting the chip to the flex circuit, and encapsulating the chip and wires, e.g., using an epoxy resin to provide environmental protection. In some embodiments, the adhesive (not shown) used to bond the chip to the flex substrate may be thermally conductive or thermally insulating. In some embodiments, ultrasonic or thermosonic wire bonding techniques may be used to electrically connect the chip to the flex substrate.

Figure 6:
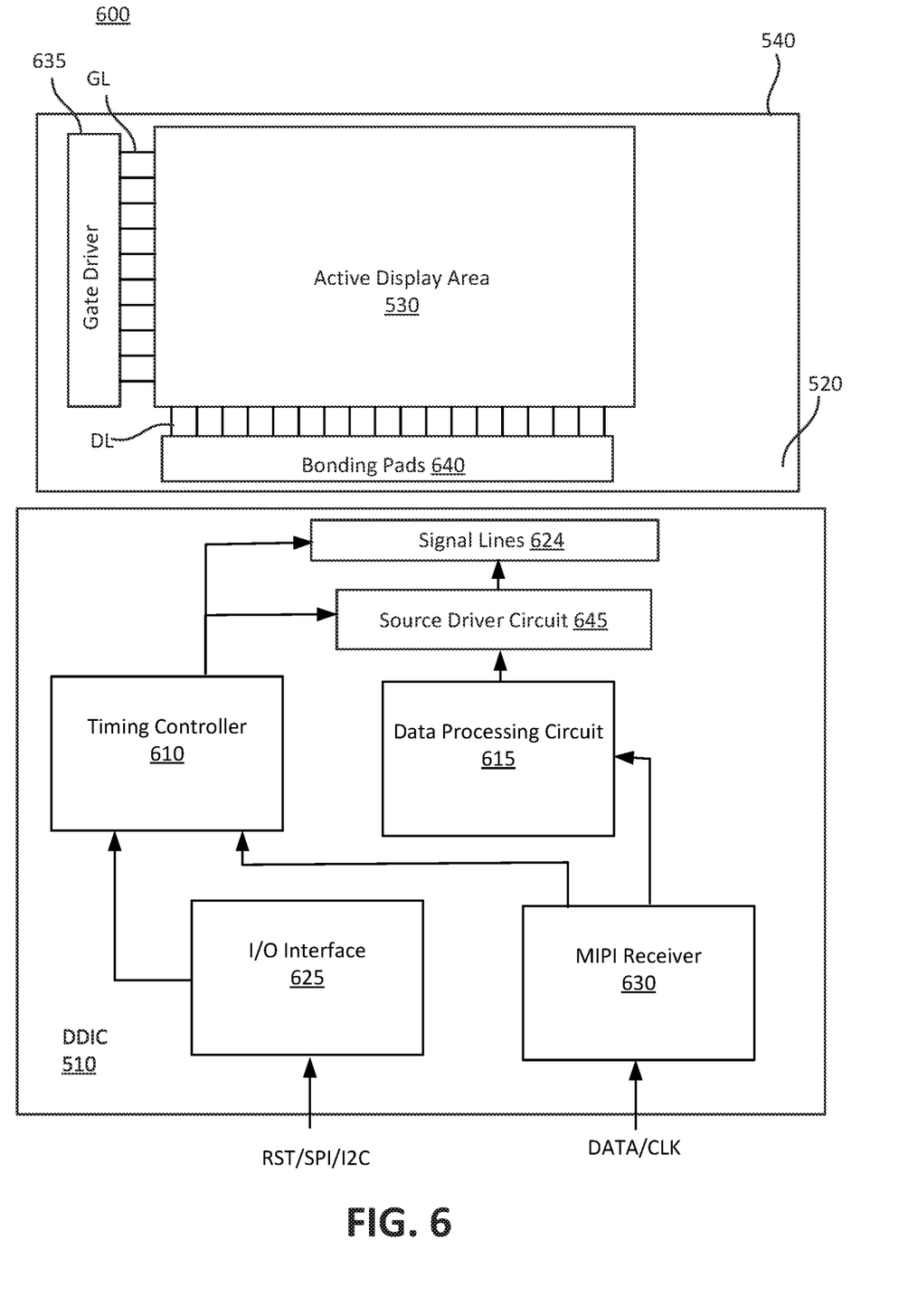
FIG. 6 is a schematic view of an OLED display device, according to some embodiments.

FIG. 6 is a schematic view of an OLED display device 600 according to some embodiments. The OLED display device 600 may include, among other components, the DDIC 510 and the display element 540. The display element 540 may be an integrated circuit including the backplane 520, the active display area 530, bonding pads 640, and a control circuit for controlling the active display area 530. The control circuit may include a gate driver 635. The DDIC 510 may include a timing controller 610, a data processing circuit 615, an input/output (I/O) interface 620, a mobile industry processor interface (MIPI) receiver 625, a source driver circuit 645 and signal lines 624. In other embodiments, one or more components of the DDIC 510 may be disposed in the display element 540.

The timing controller 610 may be configured to generate timing control signals for the gate driver 635, the source driver circuit 645, and other components in the display element 540. The timing control signals may include one or more clock signals, a vertical synchronization signal, a horizontal synchronization signal, and a start pulse. However, timing control signals provided from the timing controller 610 according to embodiments of the present disclosure are not limited thereto.

The data processing circuit 615 may be configured to receive image data DATA from the MIPI receiver 630 and convert the data format of the image data DATA to generate data signals input to the source driver circuit 645 for displaying images in the active display area 530.

The I/O interface 625 is a circuit that receives control signals from other sources and sends operation signals to the timing controller 610. The control signals may include a reset signal RST to reset the display element 540 and signals according to serial peripheral interface (SPI) or inter-integrated circuit (I2C) protocols for digital data transfer. Based on the received control signals, the I/O interface 625 may process commands from a system on a chip (SoC), a central processing unit (CPU), or other system control chip.

The MIPI receiver 630 may be a MIPI display serial interface (DSI), which may include a high-speed packet-based interface for delivering video data to the pixels in the active display area 530. The MIPI receiver 630 may receive image data DATA and clock signals CLK and provide timing control signals to the timing controller 610 and image data DATA to the data processing circuit 615.

The active display area 530 may include a plurality of pixels arranged into rows and columns with each pixel including a plurality of subpixels (e.g., a red subpixel, a green subpixel, a blue subpixel). Each subpixel may be connected to a gate line GL and a data line DL and driven to emit light according to a data signal received through the connected data line DL when the connected gate line GL provides a gate-on signal to the subpixel.

The backplane 520 may include conductive traces for electrically connecting the pixels in the active display area 530, the gate driver 635, the source driver circuit 645, and the bonding pads 640. The bonding pads 640 are conductive regions on the backplane 520 that are electrically coupled to the signal lines 624 of the DDIC 510 to receive timing control signals from the timing controller 610, and data signals from the source driver circuit 645. The bonding pads 640 are connected to the gate driver 635 and other circuit elements in the backplane 520. In the embodiment illustrated in FIG. 6, the DDIC 510 generates data signals and timing control signals and transmits the signals to the bonding pads 640 of the display element 540. However, in other embodiments, the timing controller 610, the source driver circuit 645 and/or the data processing circuit 615 may be in the display element 540 instead of the DDIC 510. When the timing controller 610 and/or the data processing circuit 615 are on the display element 540, there may be fewer bonding pads 640 since the data signals and timing control signals may be directly transmitted to the corresponding component without a bonding pad 640.

The gate driver 635 may be connected to a plurality of gate lines GL and provide gate-on signals to the plurality of gate lines GL at appropriate times. The gate driver 635 includes a plurality of stages, where each stage is connected to a gate line GL that outputs gate-on signals to a row of pixels.

The source driver circuit 645 may receive data signals from the data processing circuit 615 and provide the data signals to the active display area 530 via data lines DL. The source driver circuit 645 may include a plurality of source drivers, each source driver connected to a column of pixels via a data line DL.

Figure 7A:
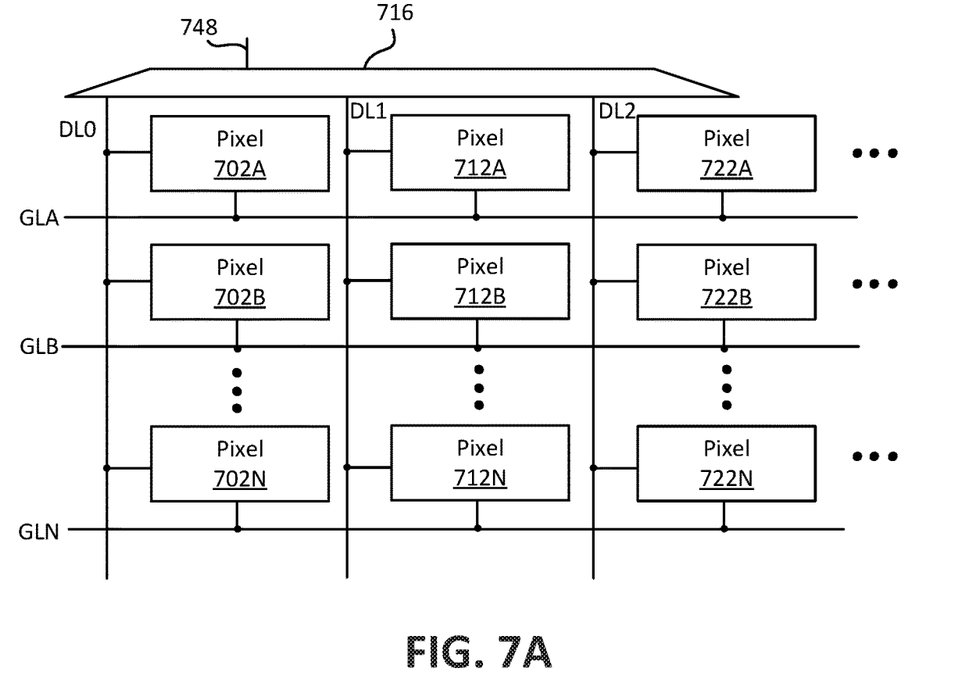
FIG. 7A illustrates an arrangement of pixels in the OLED display device, according to some embodiments.

FIG. 7A illustrates an example OLED pixel arrangement, according to some embodiments. The pixel arrangement includes, among others, columns of pixels 702A through 702N (collectively referred to also as "pixels 702" hereinafter), columns of pixels 712A through 712N (collectively referred to also as "pixels 712" hereinafter), and columns of pixels 722A through 722N (collectively referred to also as "pixels 722" hereinafter). Although not illustrated in FIG. 7A, more columns of pixels are arranged at the right side and/or the left side of pixels 722A through 722N. Each of pixels (e.g., pixel 712B) is connected to a corresponding data line (e.g., DL1) and a gate line (e.g., GLB).

Data lines (e.g., DL0 through DL2) are connected to a demultiplexer 716 that is connected to the source driver circuit 645 via the signal line 748 to receive multiplexed pixel data. Although only a single demultiplexer 716 is illustrated in FIG. 7A, other demultiplexers connected to different signal lines and other columns of pixels are arranged at the right side and/or the left side of demultiplexer 716 to program these columns of pixels. Pixel data $V_{DATA}$ for programming columns of pixels is time multiplexed by a multiplexer (not shown) and then demultiplexed by demultiplexer 716 so that fewer signal lines (e.g., line 748) may be used between the source driver circuit 645 and the array of pixels. Although it is beneficial to multiplex the pixel data for more data lines using the multiplexer and the demultiplexer, the settling time associated with a reference voltage for compensating the threshold voltage of driving transistors in the pixels may restrict the extent of multiplexing/demultiplexing, as illustrated below with reference to FIG. 8.

The gate lines GLA through GLN provide gate-on signals to pixels from the gate driver 635. In the example of FIG. 7A, each row of pixels is connected one of the gate lines GLA through GLN to receive a gate-on signal. The gate-on signal indicates when a row of pixels should be connected to a data line to receive pixel data for programming the pixels. The SEL switch is turned on when the gate-on signal is active but is turned off when the gate-on signal is inactive.

The display element 540 further includes timing signal lines (not shown) from the gate driver 635 to provide other timing signals. For example, the display element 540 may include horizontal lines carrying timing signals for operating various switches in the pixels, as described below with reference to FIG. 7B.

Figure 7B:
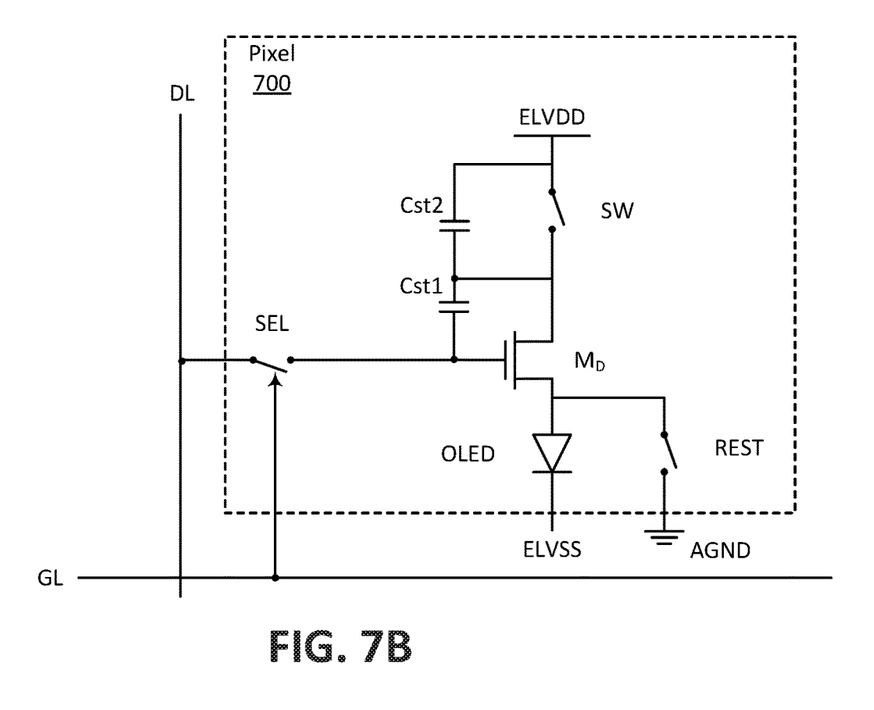
FIG. 7B is a circuit diagram of a pixel with four transistors and two capacitors, according to some embodiments.

FIG. 7B is a circuit diagram illustrating pixel 700, according to some embodiments. The pixel 700 may be any of the pixels in the display element 540 including, but not limited to pixels 702, 712, 722. The pixel 700 may include, among other components, switch SEL, a driving transistor $M_D$, an OLED, switch REST, switch SW, capacitor Cst1 and capacitor Cst2. The OLED is connected between a low voltage source ELVSS and a drain of the driving transistor $M_D$. When switch SW is turned on and switch REST is turned off, the driving transistor $M_D$ generates current in its drain that increases as a voltage stored by the storage capacitor Cst1 increases. The current is then provided to the OLED to drive the OLED. The OLED then generates light of intensity that corresponds to the amount of current provided by the driving transistor $M_D$.

The switch SEL controls a connection between the gate terminal of the driving transistor $M_D$ and the data line DL. When the gate line GL provides a gate-on signal (e.g., turns low), the switch SEL turns on, connecting the gate of the driving transistor $M_D$ to the data line DL and charging the storage capacitor Cst1 based on a voltage difference between the voltage of the pixel data at the data line DL and the high voltage level (ELVDD). When the gate-on signal is turned off in gate line GL, the switch SEL is turned off, disconnecting the gate of the driving transistor $M_D$ from the data line DL.

The switch REST enables or disables the current from the driving transistor $M_D$ to flow in the OLED. When the switch REST is turned on, current from the driving transistor $M_D$ flows through the switch REST to ground (AGND) that has a lower potential than the low voltage level ELVSS. Conversely, when the switch REST is turned off, the current from the driving transistor $M_D$ flows in the OLED.

The switch SW is turned on or off to couple a high voltage source ELVDD to a source of the driving transistor $M_D$. Capacitor Cst2 stores a voltage difference between the high voltage source ELVDD and the source of the driving transistor $M_D$ when the switch SW is turned off.

In one or more embodiments, the switches SEL, REST, SW and driving transistor $M_D$ are embodied as P-channel metal-oxide-semiconductor (PMOS) transistors. Further, these components are fabricated on a silicon substrate. Because the driving transistor $M_D$ is formed on the silicon substrate, the body effect of the transistor $M_D$ is more pronounced than when embodied as a thin-film transistors (TFTs) that are typically formed on a transparent substrate (e.g., glass).

Figure 8:
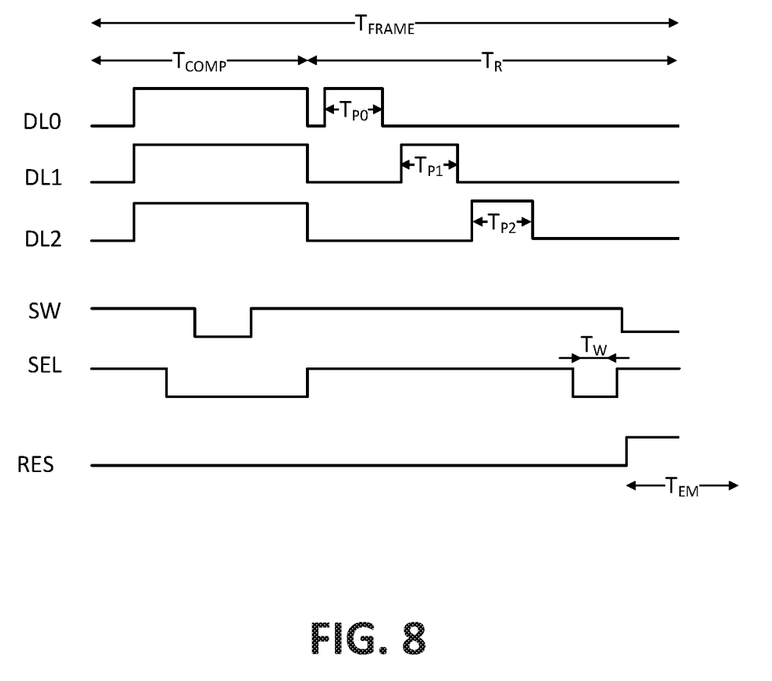
FIG. 8 is a timing diagram of signals for operating the pixels, according to one embodiment.

As the threshold voltage of the driving transistor $M_D$ changes due to deterioration or external factors (e.g., temperature), compensation operations may be performed by the pixel 700 to compensate for drift in the threshold voltage of the driving transistor $M_D$. Such compensation may be performed every frame or once in a number of frames. FIG. 8 is a timing diagram of signals for operating the pixel 700 using an external reference signal, according to one embodiment. In the example of FIG. 8, three columns of pixels 702, 712, 722 are connected to demultiplexer 716 via respective data lines DL0, DL1, DL2. SW illustrates a timing signal for turning on or off switches SW in pixels of the same row (e.g., pixels 702A, 712A, 722A), and SEL illustrate a timing signal for turning on or off switches SEL in the same rows of pixels (e.g., pixels 702A, 712A, 722A), when the switches SW and switches SEL are embodied as PMOS transistor.

To compensate for the threshold voltage of the driving transistors in the pixels, a compensation operation is performed in the columns of pixels 702, 712, 722 during compensation period $T_{COMP}$. During the compensation period $T_{COMP}$, an external reference voltage $V_{REF}$ is provided through the data lines DL0, DL1, DL2 to the pixels. Because a certain amount of time has to elapse before the reference voltage $V_{REF}$ settles, the compensation period $T_{COMP}$ may not be reduced below a certain threshold without affecting the compensation performance. Hence, the extended length of the compensation period $T_{COMP}$ reduces a remaining portion $T_R$ of a frame period $T_{FRAME}$ that may be used for preparing data $T_{P1}$, $T_{P2}$, $T_{P3}$, writing data $T_W$ and a period $T_{EM}$ for emitting light. Such shortened time of the remaining period $T_R$ limits the number of pixel data that may be multiplexed over signal line 748 because times for preparing data for only a certain number of pixels may fit within the remaining period $T_R$. Alternatively, a higher frame rate may be achieved when the same level of multiplexing over the signal line 748 is used.

Figure 9:
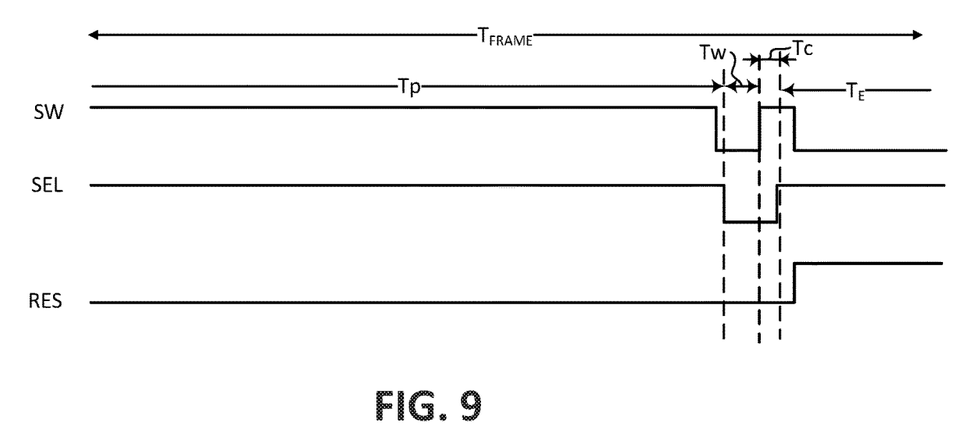
FIG. 9 is a timing diagram of signals for operating the pixels using body effect, according to some embodiments.

FIG. 9 is a timing diagram of signals for operating the pixels using body effect, according to some embodiments. In this embodiment, a separate period for transmitting an external reference voltage over the data line is not present. Instead, a compensation period Tc for performing self-compensation of the threshold voltage of the driving transistor $M_D$ is placed between a data writing period Tw for writing pixel data to pixels and an emission period $T_E$ for emitting light by the pixels.

As illustrated in FIG. 9, the preparation period $T_P$ (for preparing pixel data) is followed by the data writing period Tw, which is in turn followed by the compensation period Tc. After the compensation period Tc, an emission period $T_E$ follows during which the pixel emits light. Because of the short compensation period Tc, pixel data for more columns of pixels may be multiplexed over the same length of the frame period $T_{FRAME}$.

During the data writing period Tw, the switch SW and the switch SEL are turned on while the switch RES remains turned off. As a result, the gate voltage Vsig of the driving transistor $M_D$ corresponds pixel data $V_{DATA}$ received over data line DL because the select switch SEL is turned on. Further, source voltage Vs of the driving transistor $M_D$ correspond to the high voltage ELVDD. The gate-source voltage Vsg is also stored in the capacitor Cst1. During the data writing period Tw, the following equations are satisfied.

$$V\text{sig} = V_{DATA} \quad (1)$$

$$Vs = \text{ELVDD} \quad (2)$$

During the compensation period Tc, the switch SW is turned off but the switch SEL remains turned on. Hence, equation (1) remains valid during the compensation period. However, the source voltage Vs of the driving transistor $M_D$ satisfies the following equation due to the gate-source voltage Vsg stored in the capacitor Cst1:

$$Vs = V_{DATA} + |Vth| \quad (3)$$

where Vth represents the threshold voltage of the driving transistor $M_D$ with the source-bulk voltage $V_{SB}$ in the compensation period Tc. Further, the body effect of the driving transistor $M_D$ may be expressed in the following equation.

$$|Vth| = |Vth0| + \gamma(\sqrt{|2\emptyset + V_{SB}|} - \sqrt{|2\emptyset|}) \quad (4)$$

where $\gamma$ is the body effect parameter, $\emptyset$ refers to Fermi potential, and Vth0 refers to zero body bias ($V_{SB}=0$) threshold voltage of the driving transistor $M_D$.

During the emission period $T_E$ of FIG. 9, the switch SEL and the switch REST are turned off while the switch SW is turned on. Therefore, equation (2) is satisfied. Further, the following equation is also satisfied due to the voltage difference stored in the capacitor Cst1:

$$V\text{sig} = \text{ELVDD} - |Vth| \quad (5)$$

The current at the drain of the driving transistor $M_D$ is a function of (Vsg−Vth). Further, the following equation is satisfied:

$$Vsg - |Vth0| = \gamma(\sqrt{|2\emptyset + V_{SB}|} - \sqrt{|2\emptyset|}) \quad (6)$$

In the compensation period Tc, the source voltage of the driving transistor is slightly higher than the gate voltage of the driving transistor $M_D$ by Vth when there is no further current to discharge from the source of the driving transistor $M_D$. Hence, the following equation is satisfied in the emission period $T_E$:

$$V_{SB} = V_{DATA} + |Vth| - \text{ELVDD} \quad (7)$$

By applying equation (4) to equation (7), the following equation is obtained:

$$V_{SB} = V_{DATA} + |Vth0| + \gamma((\sqrt{|2\emptyset + V_{SB}|} - \sqrt{|2\emptyset|}) - \text{ELVDD} \quad (8)$$

Equation (8) indicates that the source-bulk voltage $V_{SB}$ is a function of the pixel data $V_{DATA}$. Hence, in the compensation period Tc, the pixel data $V_{DATA}$ may be stored in the form of source-bulk voltage $V_{SB}$ as a result of the body effect. The source-bulk voltage $V_{SB}$ set during the compensation period Tc may then be used to adjust the current from the driving transistor $M_D$ to the OLED in the emission period $T_E$ so that threshold voltage fluctuation in the driving transistor $M_D$ is compensated during the emission period $T_E$. Hence, by using the source-bulk voltage $V_{SB}$ and the body effect of the driving transistor $M_D$, a self-compensation of the threshold voltage may be accomplished.

Figure 10:
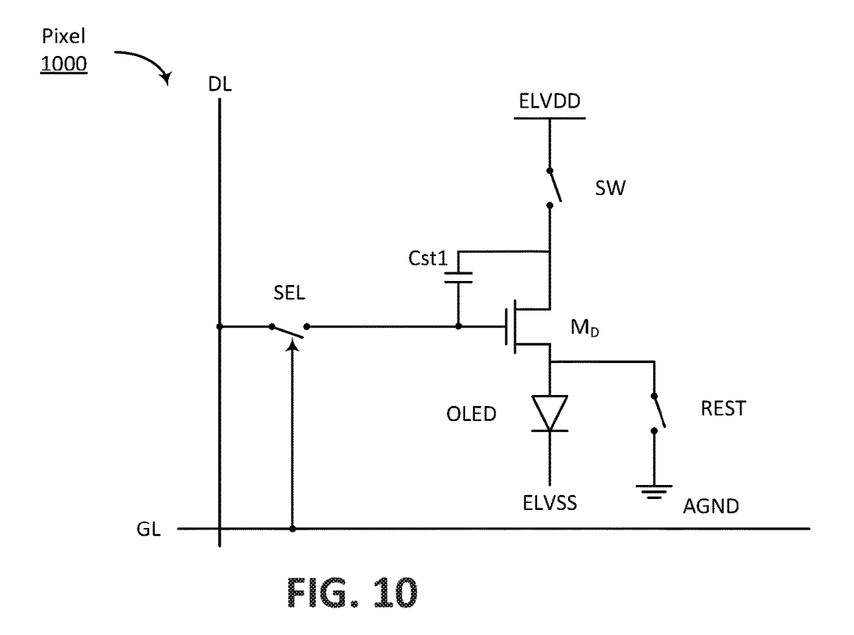
FIG. 10 is a circuit diagram of a pixel with four transistors and one capacitor, according to some embodiments.

The same principle may be applied to pixels with different pixel structures. FIG. 10 is a circuit diagram of pixel 1000 with four transistors and one capacitor Cst1, according to some embodiments. The pixel 1000 has the same structure as the pixel 700 of FIG. 7B except that the second capacitor Cst2 is removed. Despite the removal of the second capacitor, equations (1) through (8) still apply, and therefore, the body effect of the driving transistor $M_D$ may be used in the same manner to compensate for the threshold voltage fluctuation of the driving transistor $M_D$. The pixel 1000 is advantageous relative to the pixel 700 because fewer components are used to form the pixel 1000 but allows the same compensation scheme to be used.

Although embodiments are described above with reference to the pixel structures of FIGS. 7B and 10, the same principle may apply to other pixel structures to compensate the threshold voltage of the driving transistor using the body effect of the driving transistor as long as a switch is connected to the gate of the diving transistor and another switch is connected between the source of the driving transistor and a high voltage source.

Figure 11:
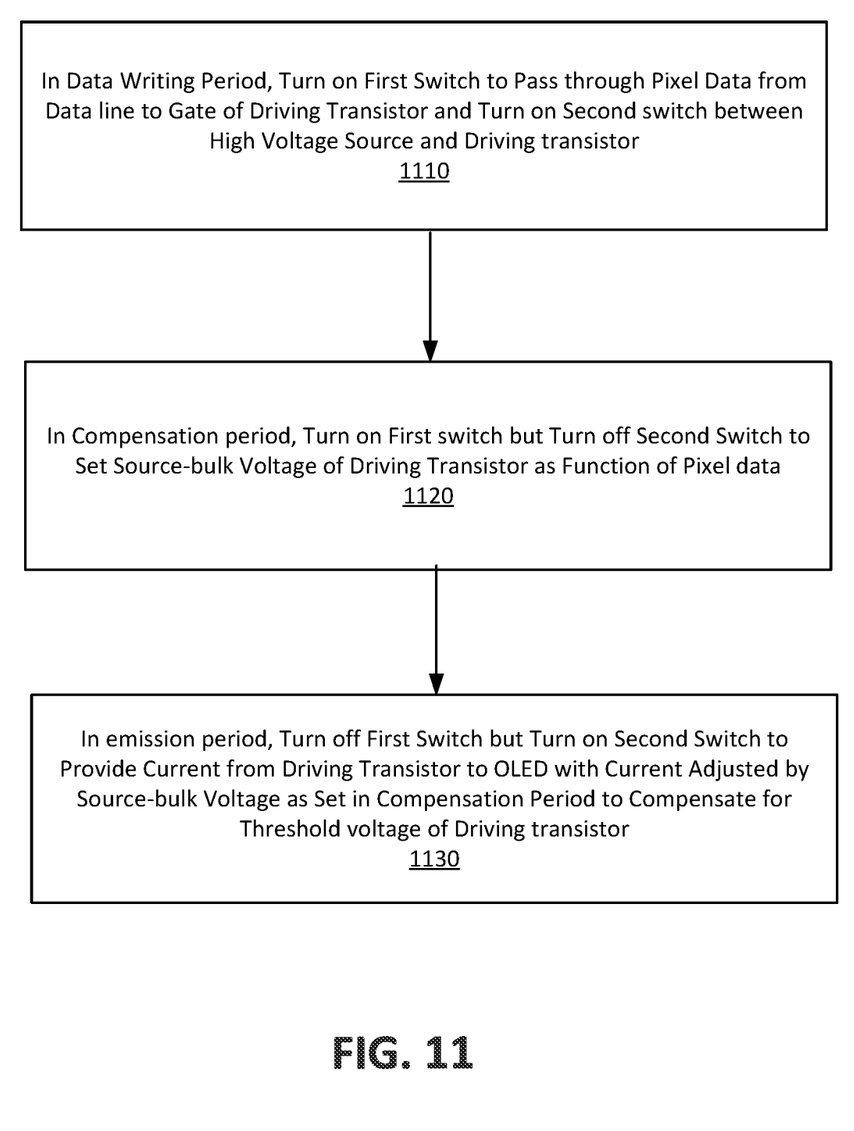
FIG. 11 is a flowchart illustrating an operation of an OLED display device, according to some embodiments.

FIG. 11 is a flowchart illustrating a method of operating a pixel in an OLED display device, according to some embodiments. In a data writing period, a first switch of the pixel is turned on 1110 to pass through a pixel data from a data line to a gate of a driving transistor after receiving a gate-on signal from a gate line. During the data writing period, a second switch between a high voltage source and a source of the driving transistor is turned off.

In a compensation period subsequent to the data writing period, the first switch is turned on 1120 but the second switch is turned off to set a source-bulk voltage of the driving transistor as a function of the pixel data.

In an emission period subsequent to the compensation period, the first switch is turned off 1130 but the second switch is turned on to provide current from a drain of the driving transistor to an organic light emitting diode (OLED). During the emission period, the current to the OLED is adjusted by the source-bulk voltage of the driving transistor as set in the compensation period so that a threshold voltage of the driving transistor is compensated.

The processes and the sequence of processes as described above with reference to FIG. 11 are merely illustrative. Various other periods/processes (e.g., data preparation period) may be added or the processes may be performed in a different sequence.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:
 a data line;
 a gate line that intersects with the data line; and
 a pixel comprising:
  an organic light emitting diode (OLED) coupled to a low voltage source;
  a first switch selectively passing through a pixel data from the data line responsive to receiving a gate signal from the gate line, the first switch turned on in a data writing period and in a compensation period subsequent to the data writing period;
  a second switch coupled to a high voltage source, the second switch turned on in the data writing period but turned off in the compensation period;
  a driving transistor having a drain coupled to the OLED, a gate coupled to the first switch to receive the pixel data in the data writing period and in the compensation period, and a source coupled to the second switch, a source-bulk voltage of the driving transistor set as a function of the pixel data and a threshold voltage of the driving transistor in the compensation period, current from the drain to the OLED in an emission period subsequent to the compensation period adjusted by the source-bulk voltage as set in the compensation period to compensate for the threshold voltage of the driving transistor; and a capacitor including a first terminal coupled to the high voltage source and a second terminal connected to the source of the driving transistor, the capacitor in parallel with the second switch and configured to store a voltage difference between the high voltage source and the source of the driving transistor.

2. The display device of claim 1, wherein the pixel further comprises:

a second capacitor between the gate of the driving transistor and the source of the driving transistor; and a third switch coupled to the drain of the driving transistor to pull down a voltage of the drain of the driving transistor when turned on in the data writing period and the compensation period, and allowing the current in the OLED when turned off in the emission period.

3. The display device of claim 2, wherein:

the threshold voltage of the driving transistor during the compensation period is a function of the source-bulk voltage of the driving transistor that is the function of the pixel data;

the threshold voltage of the driving transistor is stored in the second capacitor during the compensation period; and during the emission period, a voltage level at the gate of the driving transistor is a difference between a voltage level of the high voltage source and the threshold voltage stored in the second capacitor.

4. The display device of claim 1, wherein the first switch, the second switch, and the driving transistor are P-channel metal-oxide-semiconductor (PMOS) transistors.

5. The display device of claim 1, further comprising a demultiplexer connected to a source drive circuit and sequentially couple a plurality of data lines to a signal line from the source drive circuit in a preparation period prior to the data writing period.

6. The display device of claim 5, wherein a number of columns of pixels coupled to the demultiplexer is more than four.

7. The display device of claim 1, wherein the pixel does not receive an external reference voltage for compensating the threshold voltage.

8. The display device of claim 1, wherein the pixel is formed on a silicon substrate.

9. A method of operating a pixel in a display device, comprising:

in a data writing period, turning on a first switch of the pixel to pass through a pixel data from a data line to a gate of a driving transistor in the pixel responsive to receiving a gate signal from a gate line, and turning on a second switch between a high voltage source and a source of the driving transistor, the second switch in parallel with a capacitor that is coupled between the high voltage source and the source of the driving transistor and configured to store a voltage difference between the high voltage source and the source of the driving transistor;

in a compensation period subsequent to the data writing period, turning on the first switch but turning off the second switch to set a source-bulk voltage of the driving transistor as a function of the pixel data and a threshold voltage of the driving transistor; and in an emission period subsequent to the compensation period, turning off the first switch but turning on the second switch to provide current from a drain of the driving transistor to an organic light emitting diode (OLED), the current adjusted by the source-bulk voltage of the driving transistor as set in the compensation period to compensate for the threshold voltage of the driving transistor.

10. The method of claim 9, further comprising storing a source-gate voltage of the driving transistor in a second capacitor in the data writing period, wherein the current is a function of the stored source-gate voltage during the emission period.

11. The method of claim 10, further comprising turning off a third switch between the drain of the driving transistor and a low voltage source in the emission period.

12. The method of claim 9, wherein the first switch, the second switch, and the driving transistor are P-channel metal-oxide-semiconductor (PMOS) transistors.

13. The method of claim 9, further comprising sequentially coupling a plurality of data lines including the data line to a signal line from a source drive in a preparation period prior to the data writing period by a demultiplexer.

14. The method of claim 13, wherein a number of columns of pixels coupled to the demultiplexer is more than four.

15. The method of claim 9, wherein the pixel does not receive an external reference voltage for compensating the threshold voltage.

16. The method of claim 9, wherein the pixel is formed on a silicon substrate.

17. A pixel in a display device, comprising:

an organic light emitting diode (OLED) coupled to a low voltage source;

a first switch selectively passing through a pixel data from a data line responsive to receiving a gate signal from a gate line, the first switch turned on in a data writing period and in a compensation period subsequent to the data writing period;

a second switch coupled to a high voltage source, the second switch turned on in the data writing period but turned off in the compensation period;

a driving transistor having a drain coupled to the OLED, a gate coupled to the first switch to receive the pixel data in the data writing period and in the compensation period, and a source coupled to the second switch, a source-bulk voltage of the driving transistor set as a function of the pixel data and a threshold voltage of the driving transistor in the compensation period, current from the drain to the OLED in an emission period subsequent to the compensation period adjusted by the source-bulk voltage as set in the compensation period to compensate the threshold voltage of the driving transistor; and a capacitor coupled between the high voltage source and the source of the driving transistor, the capacitor in parallel with the second switch and configured to store a voltage difference between the high voltage source and the source of the driving transistor.

18. The pixel of claim 17, further comprising:

a second capacitor between the gate of the driving transistor and the source of the driving transistor; and a third switch coupled to the drain of the driving transistor to pull down a voltage of the drain of the driving transistor when turned on in the data writing period and the compensation period, and allowing the current in the OLED when turned off in the emission period.

19. The pixel of claim 17, wherein the pixel does not receive an external reference voltage for compensating the threshold voltage.

20. The pixel of claim 17, wherein the first switch, the second switch, and the driving transistor are P-channel metal-oxide-semiconductor (PMOS) transistors.

* * * * *